Dec. 13, 1927.
J. LEDWINKA
1,652,902
CLOSED VEHICLE BODY STRUCTURE
Original Filed Nov. 6, 1919    3 Sheets-Sheet 1
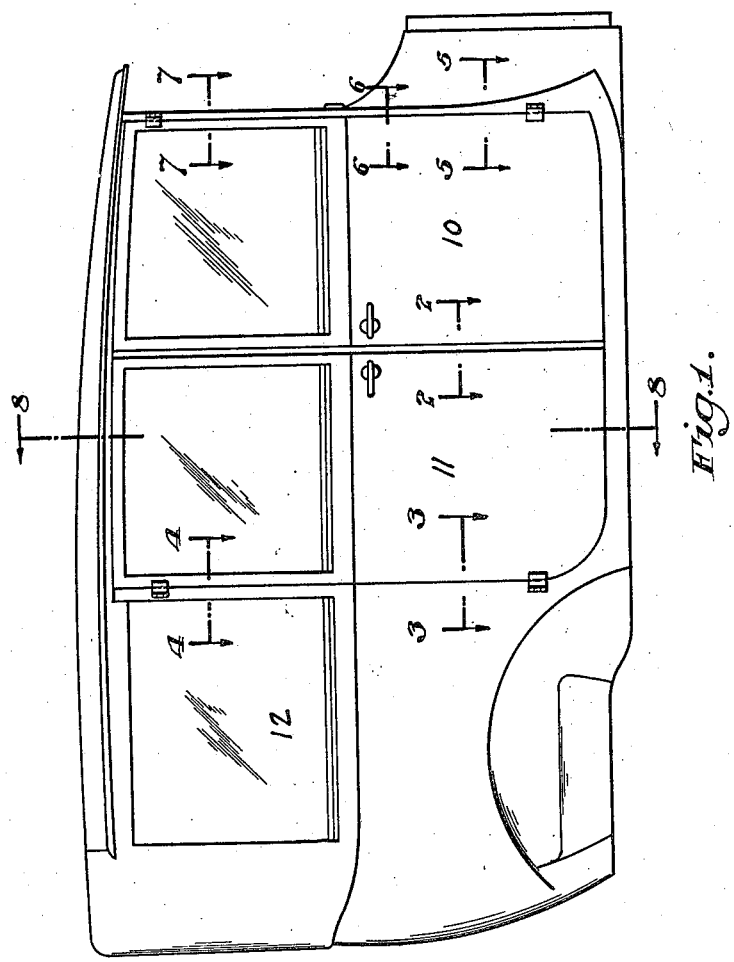
INVENTOR:
Joseph Ledwinka,
BY
ATTORNEY.

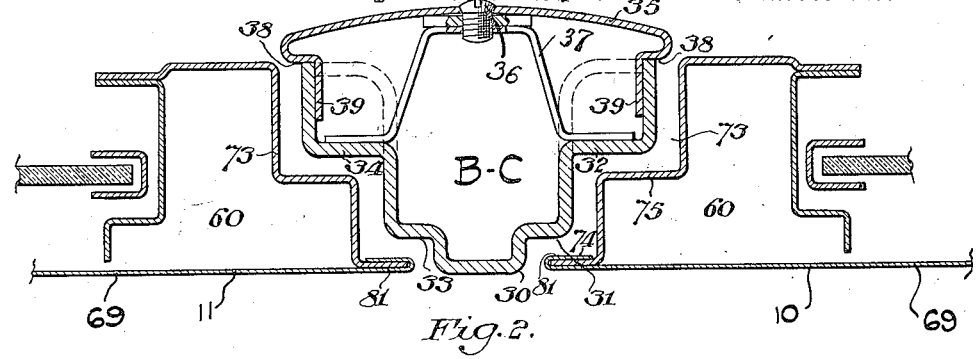
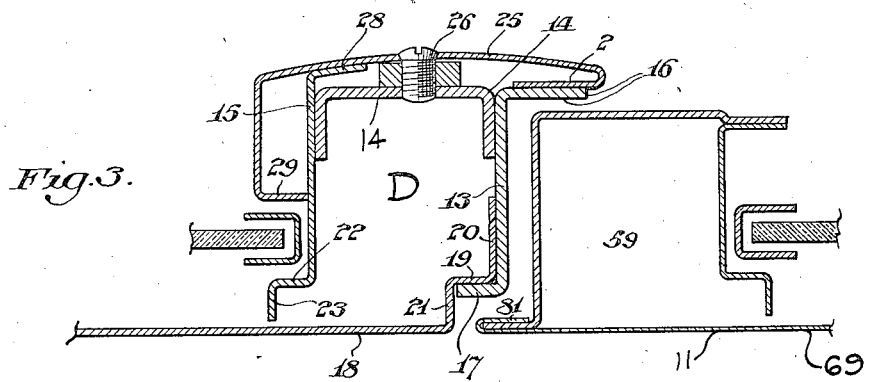
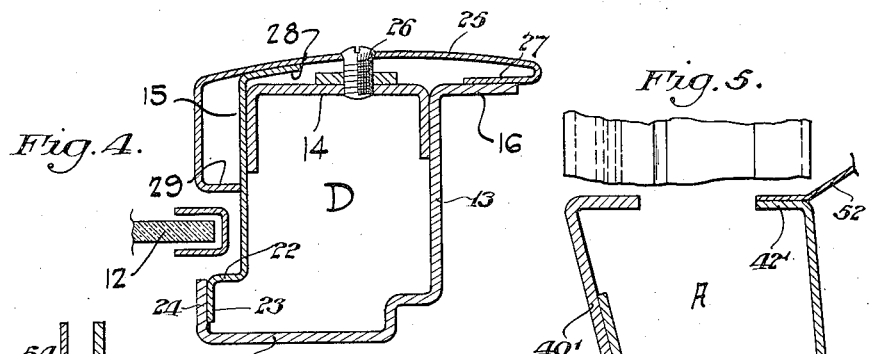
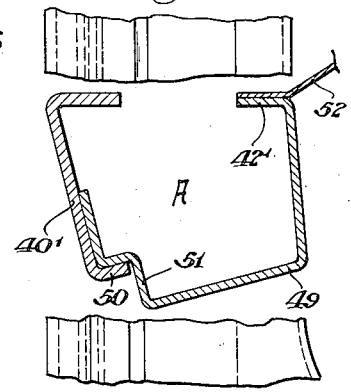
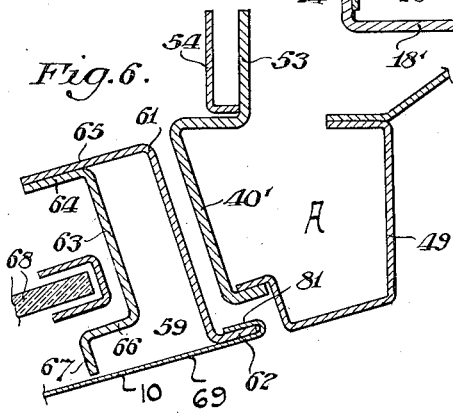

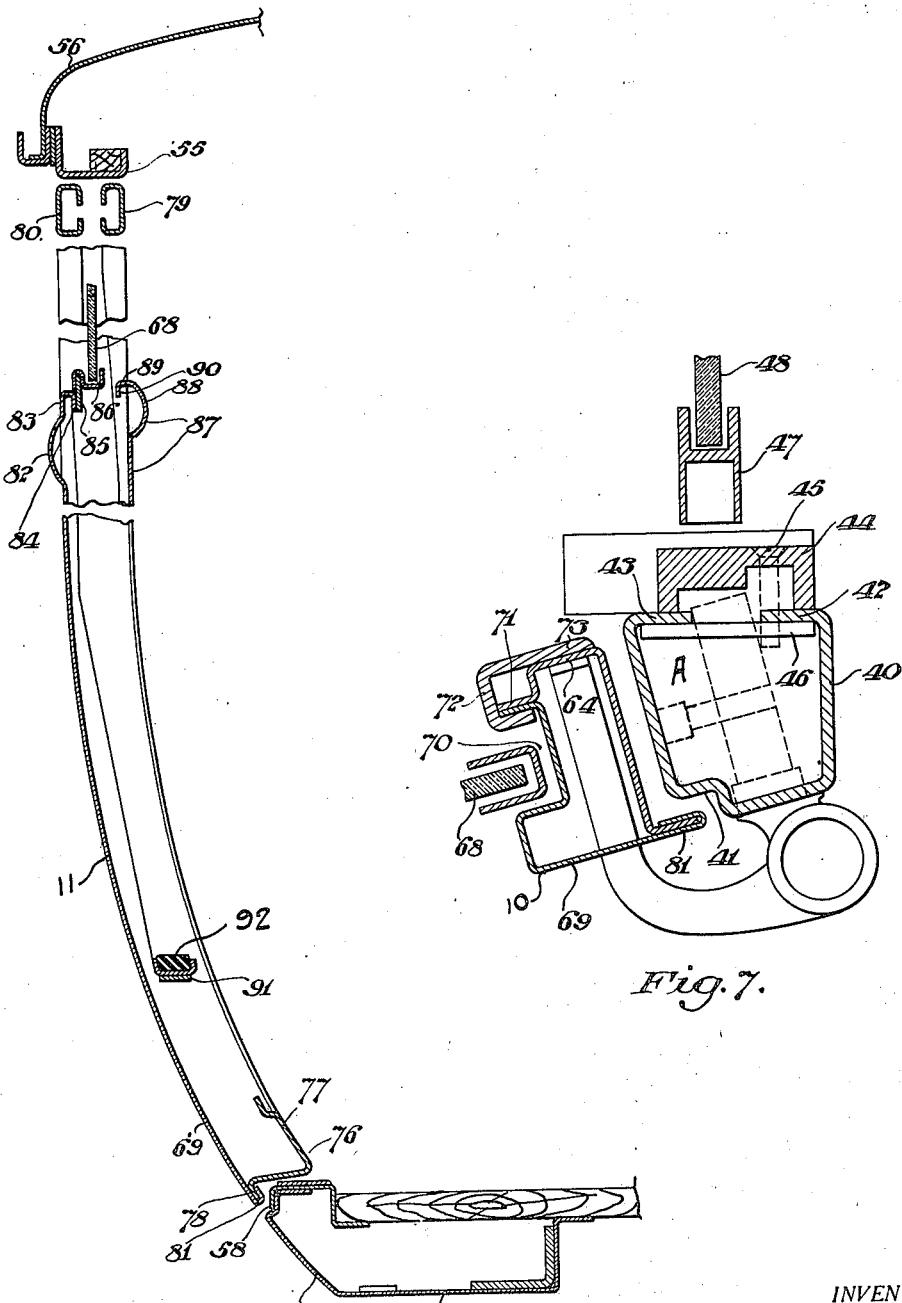

Patented Dec. 13, 1927.

1,652,902

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

CLOSED VEHICLE BODY STRUCTURE.

Original application filed November 6, 1919, Serial No. 336,058. Divided and this application filed September 2, 1926. Serial No. 133,131.

This invention relates to closed body structures for automobiles, and more particularly to door frame and door structures and parts more or less intimately related thereto.

The subject matter of this application is fully disclosed in applicant's pending application, Serial No. 336,058 filed November 6, 1919, for closed body structures for automobiles, of which this application constitutes a division.

The object of the invention is to provide a sheet metal construction of this kind which is simple in construction, yet very strong and durable and well adapted to take the stresses and strains to which such structures are subject in use, and which is economical to manufacture.

To the attainment of this object and other objects as will appear from the following description, the door frames and doors of the improved construction are so made out of steel stampings as to permit them to be very readily formed and assembled, as by welding or otherwise to form the completed structure and to permit the ready association therewith and attachment thereto of parts such as trim or paneling, more or less intimately related thereto and entering into the completed body structure.

The structures employed in the attainment of the objects are illustrated by way of example in the accompanying drawings showing one embodiment of my invention.

In the drawings:—

Figure 1 is a view in side elevation of a closed body structure in which the invention is embodied.

Fig. 2 is an enlarged detail sectional view of the center post and the adjacent door rail structures, taken on the line 2—2 of Fig. 1.

Fig. 3 is an enlarged detail sectional view of the hinge post structure for the rear door and the adjacent hinge rail structure of the door, taken on the line 3—3 of Fig. 1.

Fig. 4 is a similar view of said hinge post taken on the line 4—4, the section through the adjacent door rail being omitted.

Figs. 5, 6, and 7 are, respectively, enlarged detail sectional views taken on the lines 6—6, 7—7 and 8—8 of Fig. 1, showing the front door hinge post structure at various points, Fig. 5 showing additionally broken detail elevational views of the inside and outside of said post structure, and Figs. 6 and 7 showing also the adjacent door rail structure.

Fig. 8 is an enlarged sectional view, parts being broken away, through a side of the body at one of the door openings as indicated by the line 8—8 of Fig. 1.

The same part is designated by the same reference numeral whenever it occurs throughout the several views.

In the manufacture of closed automobile bodies, it is highly important that the frame structures surrounding the doors and supporting the roof and windshield and other structures be strong and rigid to take the strains and stresses to which such bodies are subjected in use. At the same time it is important also that they be not too bulky, especially above the belt line, where they would otherwise too greatly obstruct the vision. The employment of sheet steel in the manufacture of these parts insures greater strength and durability, but to enable sheet steel stampings to be employed in the manufacture of such bodies, it is essential that these stampings be efficiently braced and shaped to enable them to be readily assembled in the body structure, so as to form a strong integral structure. The doors also need to be formed so as to cooperate with shoulders in these openings to provide a neat exterior appearance and because of the great length of the doors they need to have strongly braced rail structures.

It is among the special purposes of my invention to provide frame structures for the door openings and for the doors which coact to provide a wide range of vision, and at the same time provide rigid and strong deep channel or boxlike structures capable of effectively taking up the strains and stresses to which such bodies are subjected in use. At the same time these frame structures are adapted to provide for the ready attachment of sheet metal or other trim, windshield and instrument board supports, etc. The structures which go to effect these purposes are what I particularly aim to point out in the following detailed description and in the claims appended hereto.

Referring to the accompanying drawings,

I have shown the invention embodied in a closed body of the sedan type in which the side of the body is provided between the cowl and the tonneau with two door openings, normally closed by the front door 10 and the rear door 11. Behind the rear door the tonneau is provided above the belt line with a window opening normally closed by a window 12. As disclosed in the parent application the sides, back and roof of the body are, except for the doors and windows, inclosed by a sheet metal shell comprising panels suitably secured together and to the inner skeleton frame work, also of sheet metal. The main members of the skeleton framework comprise the longitudinally extending side sill structures upon which are founded the vertically extending door frame posts A, B—C and D arranged respectively at the front corner, between the doors and at the rear edge of the rear door. A top rail connects the upper ends of the posts and aids in supporting the roof structure.

In general, the posts of the skeleton frame work are made of box-like or deep channel sections and formed either of a simple sheet metal stamping or built up out of a plurality of stampings secured together to form a rigid and integral structure.

The D post consists of stampings 13, 14 and 15, the main member 13 being of simple Z section below the belt line as shown in Fig. 3, the main web of the Z extending in the direction of the door opening, its inner arm 16 extending into the door opening to provide a door stop, and its outer arm 17 extending in the opposite direction. The forward edge of the tonneau paneling 18 of lighter gauge sheet metal than the main member 13 of the post structure has extending inwardly from the main body thereof a portion bent into a Z section, the two inner elements 19 and 20 of the Z fitting against and being secured to the web and the outer arm 17 of the post member 13 while the outer element 21 of the Z forms with the arm 17 a rabbet to receive the edge of the door. Above the belt line the outer paneling 18′ is formed as shown in Fig. 4 as a single stamping with the main member 13 of the post, although the paneling and post may be formed separately and joined, as by welding, as they are below the belt line. The post structure is also provided above the belt line with a rabbet to receive the edge of the door.

The stamping 14 is of substantially U or channel shape in cross section to the outer surface of one flange of which is applied the stamping 13 and to the outer surface of the other flange, the stamping 15. These parts are secured together by welding or otherwise. The stamping 15 is bent adjacent its outer edge to form a shoulder 22 at right angles to its main body web and a flange 23. The shoulder 22 and main web thus form respectively a side and the bottom of a glass run channel in which the side window 12 of the tonneau is guided. Above the belt line the flange 23 is applied and secured to an inwardly extending flange 24 at the rear edge of the paneling 18′ forming the outer surface of the post at that region. Thus it will be seen that the D post structure comprises a very rigid box section above the belt line, and below the belt line a deep channel section presenting outwardly and the post is so formed of metal stampings as to include in its structure parts of the glass run channel for the window 12, and a rabbet to receive the edge of the door and a door stop.

A cap stamping 25 providing trim is applied to the inside of the post structure and is made removable, being retained in place by the removable screws 26. This cap stamping 25 has one edge portion 27 bent back upon itself to present a smooth rounded surface at the door opening, this bent back portion 27 seating against the outer surface of the arm 16 of the Z section post stamping 13. At the opposite side of the post the stamping 25, which is bowed to present a rounded surface toward the inside of the body, rests upon a correspondingly shaped flange 28 at the inner edge of post stamping 15. The cap stamping 25 is carried rearwardly beyond the main transverse web of the stamping 15 a distance approximately equal to the depth of the glass run channel, this rearwardly extending portion being of channel form, in cross section, the outer side 29 of the channel co-operating with the shoulder 22 to complete the glass run channel for the window 12. By making the cap 25 removable the insertion and removal of the window is facilitated.

The central or B—C post between the front and rear door-ways is formed, as shown in Fig. 2, of a stamping 30 suitably pressed into shape to form shoulders 31, 32, 33, 34, to receive, respectively, the correspondingly shaped vertical edge portions of the front and rear doors. To this end the stamping is formed in cross section of substantially channel formation. The inner open side of the channel is closed by a removable cover or cap member 35 providing trim, which may be connected by removable screws 36 to bridge members 37 secured within the channel member 30. The cap member is made of sheet metal bowed outwardly to present a rounded surface inwardly of the body, and is bent back upon itself at its edges for a short distance, as at 38, 38 to present smooth rounded surfaces at the door openings, extending beyond the edge portions of the channel post. Beyond said bent back portions 38, the cap member 35 is formed with flanges 39 adapted to fit within the sides of the channel post 30 when the member is applied to the post, all as clearly shown in Fig. 2.

The A or hinge-post structure for the front door is generally of channel formation in cross section and tapers from top to bottom, as clearly shown in Figs. 1, 5, 6 and 7. At the points above the belt line, the A post is formed of a stamping 40 as shown in Fig. 7 which is pressed into channel formation and provided with a shoulder 41 to receive adjacent edge of the front door 10. The sides of the channel are flanged inwardly toward each other at 42 and 43. The flanges 42 and 43 form surfaces against which the windshield standards 44 may be applied and removably secured by screws 45 screwing into a plate 46 seating against the inside surfaces of the flanges 42 and 43 of the post stamping 40. The standards 44 support the windshield frame 47 surrounding the windshield glass 48, in any suitable manner, not shown. By this construction the windshield standards serve the additional function of providing trim for the open inner side of the post stamping 40.

Below the belt line the A post structure may comprise the separate substantially channel shaped stampings 40', 49 integrally joined together, as by welding. The part 40' may be a downward extension of the upper post stamping 40. Obviously the separate stamping construction might extend from end to end of the A post structure, if the processes of manufacture were thereby facilitated.

Below the belt line the rabbet for receiving the edge of the door is provided by an outer flange 50 on the member 40' and a portion 51 on the outer channel stamping or paneling 49, which portion extends at right angles to the flange 50 and the bottom of the channel stamping 49. Beyond the portion 51 the member 49 is bent into angular shape in cross section and fits against and is secured to the angle formed by the flange 50 and the main web of the channel stamping 40'. Along this lower portion of the post structure the cowl panel 52 of lighter gauge sheet metal than the post structure is attached as shown in Figs. 5 and 6 to the rearwardly extending flange 42 formed at the edge of the forward side of the channel stamping 49. In the region of the instrument board, as shown in Fig. 6 the channel stamping 40' may have an inwardly extending flange 53 which serves as a support for the instrument board 54.

By making the A post structure tapering in form, it is effectively buttressed at its lower portion so as to greatly strengthen it against bending moments in that region.

By reference to Fig. 8, it will be seen that the upper portion of the frame surrounding the doors consists of a channel shaped rail 55 supported from the vertical post structures hereinbefore described, and forming a support for the roof structure 56. At the doorways, the door sill and threshold structure indicated generally by the numeral 57 is formed with a rabbet providing a shoulder 58 for receiving the lower edge of the doors. By reason of this rabbeted construction of the vertical post structures and the sill and threshold structure, it will be seen that the outer surfaces of the doors, when closed, lie flush with the outer surface of the body parts adjacent the door openings.

The door construction is clearly shown in Figs. 2, 3, 6, 7 and 8. From these figures, it will be seen that the frame work of the doors comprises deep channel or box-section side rail structures, corresponding generally to the post structure with which they coact, the hinge rail structures being generally designated by numeral 59 and the lock rail structures by numeral 60. As shown in Fig. 8, these side rail structures are curved longitudinally to conform to the body lines.

The front and rear doors 10 and 11 are substantially alike in structure and since the front door is most fully disclosed, the door structure will be further described more particularly with reference to the front door.

Below the belt line the hinge rail structure 59 of the front door 10 comprises two sheet metal stampings. One of these stampings is of Z section and has its main web portion 61 adapted to extend parallel to the door opening and its outer branch 62 forming the edge of the door adapted to extend into the rabbet of the door post. The other stamping 63 entering into the rail structure is of substantially channel shape in section, the channel presenting inwardly, and one side 64 thereof being applied and secured to the inner arm 65 of the Z section stamping. This channel member, as clearly shown in Fig. 6, forms the bottom and sides of a glass run channel in which the window glass 68 is guided when lowered into the lower portion of the door. The outer side 66 of the channel stamping 63 is provided at its edge with a laterally extending stiffening flange 67. It is to be noted that the rail structure 59 is relatively thin in the plane of the door so as to make the opaque projection at the front corner or A post relatively small to permit an extensive range of vision. From the showing in Fig. 3, it is apparent that the hinge rail 59 for the rear door is generally similar in construction to that of the front door, except that it is thicker than the front door hinge rail.

In Fig. 7, I have shown the construction of the hinge rail in the upper portion of the door opposite the window opening therein. At this point the rail structure is of a box-section, the outer paneling 69 taking the place of the channel member 63 in the lower portion of the door structure. Also, to narrow the window guiding channel 70 in this portion of the door, I may offset the inner arm of the Z section stamping of the door rail structure in this region so as to provide the offset flange 71, which is secured to the outer flange of the channel 70 formed by the outer paneling 69. The door rail structure may be reinforced and trimmed on its inner side by a channel member 72 having sides of unequal length, the longer side 73 being applied and secured to the arm 64 of the Z shaped member 61 and the shorter arm to the inside surface of the inner side wall of glass run channel 70.

The jamb rail structure 60 of the door differs from the hinge rail structure only in the substitution of a stamping 73 of double Z section for the single Z section stamping of the hinge rail structure. This double Z section provides two shoulders 74, 75, for cooperation with the corresponding shoulders 31, 32, respectively on the B—C post. This interfitting construction between door and door post provides an effective door stop and a smooth exterior surface for the car body, while at the same time providing great strength and rigidity, and attaining a much greater range of vision than has heretofore been attained in closed car bodies.

The jamb rail structure 60 of the rear door corresponds exactly to the front door construction and cooperates with the shoulders 33 and 34 of the B—C post in a manner entirely similar to the front door jamb rail structure.

The side rail structures 59 and 60 of the door are joined at the bottom by connecting member 76 of substantially Z section having a long arm 77 forming a portion of the inside door paneling and a short arm 78 forming the edge of the door and seating, when the door is closed, in the rabbet forming the shoulder 58 in the edge of the sill and threshold structure 57.

At the top the side rail structures are joined by a channel section rail 79 presenting outwardly, as shown in the sectional view of Fig. 8, and also by an opposed channel section member 80, presenting inwardly which latter may form the outer paneling of the door at the top. The members 79 and 80 are shown spaced from each other a distance sufficient to permit the insertion from the top of the window glass 68. The outer paneling 69 is applied to the side and bottom frame structures by clinching its side and bottom edges over the outer arms of the Z section stampings, as shown at 81, Figs. 2, 3, 6, 7 and 8.

Just below the window opening the paneling 69 is shown provided with a bead 82 and above this bead it is flanged inwardly at 83 and downwardly at 84. A strip 85 is secured to the flange 84 and projects above the inwardly extending portion 83. To this upwardly projecting portion of the strip 85 is secured a channel member 86 in which the lower edge of the glass 68 rests when the window is closed.

An inner panel 87 joins the side rail below the window opening, this panel being formed with a bead 88 and being formed with an inwardly extending portion 89 in the plane of the bottom of the window opening which inwardly extending portion is flanged downwardly at 90. The flange 90 and the inner flange of the window glass supporting channel 86 are spaced a distance sufficient to permit the window glass to be lowered between them into the lower portion of the door, where it is supported by a window stop 91 cushioned by a resilient cushion 92.

From the foregoing description it will be evident that I provide a very efficient door frame and door construction in which the various stampings and elements entering into the structure may be readily produced in quantities and secured together in proper relation easily and quickly, thus greatly reducing the time required to assemble and complete the bodies incorporating these features, and when so assembled and united they contribute to the production of a strong, rugged body structure in which the various parts reinforce and brace each other, and in which such strength and ruggedness is obtained without unduly interfering with the range of vision which heretofore has been one of the objections to closed body structures. By forming the glass run channels in the post structures and door rail structures, instead of by applying channel strips to the outside of the posts and rails, the opaque projection of the body posts is materially reduced. Another factor tending to reduce the opaque projection in the region of the A posts is the very appreciably reduced width of the hinge rail of the front door and the decreased width of the A post above the belt line as compared with its width below the belt line.

Having now set forth the objects and nature of my invention, and a construction embodying the features and principles thereof, what I claim as new and desire to secure by Letters Patent is:—

1. A closed body structure for automobiles having front and rear doorway openings in a side thereof, comprising a channel shaped sheet metal member forming a door post disposed intermediate said door openings and having shoulders or abutments on the forward and rearward sides thereof to receive the edges of the front and rear doors, and a stamping forming trim for the inner side of said post, the edges of said stamping being bent backwardly upon the body thereof and then outwardly to be received against the side walls of the post.

2. A closed body structure for automobiles having front and rear doorway openings in the sides thereof, comprising a channel shape sheet metal member forming a door post disposed intermediate said door openings and having shoulders or abutments on the forward and rearward sides thereof to receive the edges of the front and rear doors respectively, and a bridge piece extending across the channel of the post, and a finishing member secured to said bridge piece and having its edge portions overlapping the sides of the channel shaped member.

3. A closed body structure for automobiles having front and rear doorway openings in the sides thereof, comprising a substantially hollow door post structure disposed intermediate said door openings, and having a pair of shoulders or abutments on the forward and rearward sides forming double rabbets thereof to receive the correspondingly rabbeted edges of the front and rear doors, whereby the edges of the doors close against the post flush with the outer face thereof.

4. A vehicle body comprising in combination a pressed metal door and a coacting door post, the exterior surfaces of which lie substantially in the same plane and form a portion of the exterior surface of the body, coacting rabbeted sections on the door and door posts respectively in a vertical plane intermediate the inside and outside surfaces of the door, and a door overlap accommodated within a supplementary rabbet in the post.

5. In a construction for automobile bodies, a door having a door jamb overlap along an edge thereof and a door post forming a portion of the exterior surface of the body and having a rabbet in the edge thereof adjacent the door to receive said overlap, whereby the exterior surface of the body at the meeting edges of the door and door post is substantially smooth.

6. In an automobile body, a sheet metal post of channel cross section, the channel presenting inwardly of the body, a bridge member between the side walls of the channel and an interior finishing strip secured across the open mouth of the channel by fastening to the bridge member.

7. In an automobile body, a sheet metal post of channel cross section, and a finishing strip of stamped metal secured across the open mouth of the channel and having an edge portion turned back upon the body thereof and overlapping a side wall of the channel.

8. In a closed body for automobiles, a metal door post of substantially channel formation, the side walls of said channel extending inwardly of the body, said inwardly extending walls having flanges constituting a windshield frame support and finish.

9. In a closed body for automobiles, a metal door post structure having cross section above the belt line of substantially channel form, and an element of a windshield structure bridging the walls of said channel and closing its mouth whereby to provide a finish for the inner face of the post structure.

10. In a body for automobiles, a door post structure comprising a substantially channel shaped stamping constituting a portion of the exterior surface of the body, one wall of said stamping being secured to the rear edge of a cowl panel, and the other wall thereof being provided with a rabbet to accommodate a projecting portion of a door.

11. In a body for automobiles, a sheet metal cowl panel, a sheet metal door post of substantially channel shaped cross section, the channel presenting inwardly and constituting a portion of the outer shell of the body, the forward wall of said channel being provided with a flange along its free edge, said cowl panel being secured to said flange.

12. In a body for automobiles, a metal door post structure of substantially channel shape in cross section, said channel presenting inwardly and being provided in the rear wall thereof with outer and inner shoulders constituting respectively abutment for a door and means for attachment of an instrument board.

13. In a vehicle body, the combination with a body portion adjacent to the door opening, of a reinforcing post therefor formed of heavier gauged pressed sheet metal, said post embodying a Z-section member, one portion of which lies adjacent to the outer panel of the body, another portion parallel to the door opening, and a third portion constituting a stop for the door.

14. In a closed body structure for automobiles, a pressed metal post structure rising between door and window openings and formed on one side thereof with a shoulder providing a door stop and on the opposite side thereof with a shoulder forming a side of a channel for receiving the edge of a window glass.

15. In a closed vehicle body structure, a pressed metal post rising between window and door openings, and formed along its inner portion on one side thereof with a forwardly directed flange forming a door stop shoulder and having a rearwardly directed flange on the opposite side thereof along its outer portion forming a portion of a window channel.

16. In a closed vehicle body structure, a pressed metal post comprising a stamping including a portion forming the transverse face of a doorway opening, said transverse portion being flanged along one of its edges and a separate stamping secured to said flanged portion and forming an angle to receive the edge of a window glass.

17. A pressed metal frame member for closed vehicle bodies having a rabbet portion extending longitudinally of one side thereof, and a moulding strip secured to said member and cooperating with said rabbet to form a channel for a glass run, said moulding strip having a lateral flange overlapping another side of said frame member.

18. In a closed body structure for automobiles having a window opening, a post member at the edge of the window opening, said post member formed with a shoulder, a cap plate for said post member having a shoulder cooperating with the shoulder on the post member to form a channel, and a window panel for said opening, said panel fitting at its edge in said channel.

19. In a closed body structure for automobiles, having a window opening, a post member at the edge of the window opening, said post member formed with a shoulder, a cap plate for said post member having a shoulder cooperating with the shoulder on the post member to form a channel, and a window panel for said opening, said panel fitting at its edge in said channel, said cap plate being removable to permit the insertion and removal of said window panel.

20. In a closed body structure for automobiles having a window opening, a vertical post disposed at the edge of the window opening, said post being formed with a depression on the side thereof adjacent said opening, a removable stamping applied to the inner side of said post and having a flanged portion extending over the side of said post adjacent the window opening to cooperate with said depression to form a channel, and a window panel having its edge received in said channel.

21. In a closed body structure for automobiles having a side window opening, a door post structure at the vertical edge of said opening, and having a shoulder on the forward side thereof to receive the edge of the door, and having a channel on the rear side thereof opposite the window opening to receive a window panel, and a removable cap plate for the inner side of said post, said cap plate constructed to form one wall of said channel.

22. In a closed body structure for automobiles having front and rear doorway openings in the sides thereof, a channel shaped sheet metal stamping to form a door post disposed intermediate said door openings, and having shoulders or abutments on the forward and rearward sides thereof to receive the edges of the front and rear doors, and a stamping forming a cap plate for the inner side of said post stamping.

In testimony whereof he hereunto affixes his signature.

JOSEPH LEDWINKA.